United States Patent
Chorosinski et al.

[11] Patent Number: 5,945,651
[45] Date of Patent: Aug. 31, 1999

[54] REMOTELY PROGRAMMABLE MEDICATION DISPENSING SYSTEM

[76] Inventors: Leonard Chorosinski, 1126 Fieldstone La., Bartlett, Ill. 60103; Shawn P. Miles, W. 2189 Smiss Rd., Oostburg, Wis. 53070; William V. Miles, 1530 N. Pine, Arlington Heights, Ill. 53070

[21] Appl. No.: 08/895,622

[22] Filed: Jul. 17, 1997

[51] Int. Cl.$^6$ .................................................. G06K 7/10
[52] U.S. Cl. ................... 235/375; 235/381; 235/462.13
[58] Field of Search .................................. 235/375, 377, 235/381, 462.15, 462.13

[56] References Cited

U.S. PATENT DOCUMENTS

| | | | |
|---|---|---|---|
| 4,616,316 | 10/1986 | Hanpeter et al. | 364/413 |
| 4,655,026 | 4/1987 | Wigoda | 53/55 |
| 4,695,954 | 9/1987 | Rose et al. | 364/413 |
| 4,733,362 | 3/1988 | Haraguchi | 364/479 |
| 4,748,600 | 5/1988 | Urquhart | 368/10 |
| 4,790,118 | 12/1988 | Chilcoate | 53/411 |
| 4,847,764 | 7/1989 | Halvorson | 364/413.02 |
| 5,014,875 | 5/1991 | McLaughlin et al. | 221/2 |
| 5,020,037 | 5/1991 | Raven | 368/10 |
| 5,047,948 | 9/1991 | Turner | 364/479 |
| 5,065,655 | 11/1991 | Haber | 83/322 |
| 5,072,430 | 12/1991 | Eckernas et al. | 368/10 |
| 5,102,008 | 4/1992 | Kaufman et al. | 221/25 |
| 5,119,969 | 6/1992 | Haber | 221/71 |
| 5,267,174 | 11/1993 | Kaufman et al. | 364/479 |
| 5,329,459 | 7/1994 | Kaufman et al. | 364/479 |
| 5,338,384 | 8/1994 | Reichert | 156/212 |
| 5,412,372 | 5/1995 | Parkhurst et al. | 340/568 |
| 5,713,485 | 2/1998 | Liff et al. | 221/2 |
| 5,737,539 | 4/1998 | Edelson et al. | 395/203 |

OTHER PUBLICATIONS

ATC 212 System, Automated Medication Dispensing System brochure published by Baxter Healthcare Corporation, copyright 1991 * No month available.

*Primary Examiner*—Donald Hajec
*Assistant Examiner*—Jared J. Fureman
*Attorney, Agent, or Firm*—Welsh & Katz, Ltd.

[57] ABSTRACT

A medication dispensing system including a relatively small, microprocessor-controlled machine that assists in the accurate execution of a physician-prescribed medication regimen is disclosed. The correct dose of each medication that is to be dispensed at a particular time is stored in an individual packet defined in a flexible tape. The machine dispenses each packet of medication in the correct dose at the prescribed time by analysis of the information regarding the medications to be dispensed and other patient information which is printed in text and in barcode on the packets of the flexible tape. The machine can be used as a stand-alone unit, or can be integrated into a centrally-controlled pharmaceutical network.

8 Claims, 8 Drawing Sheets

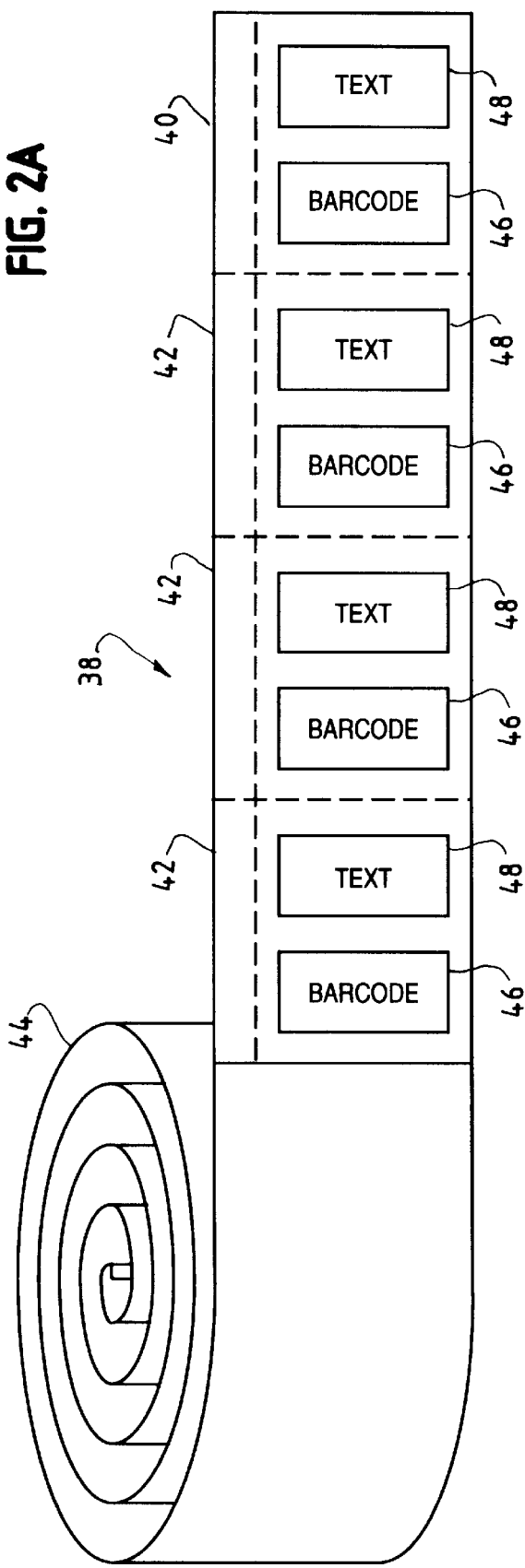
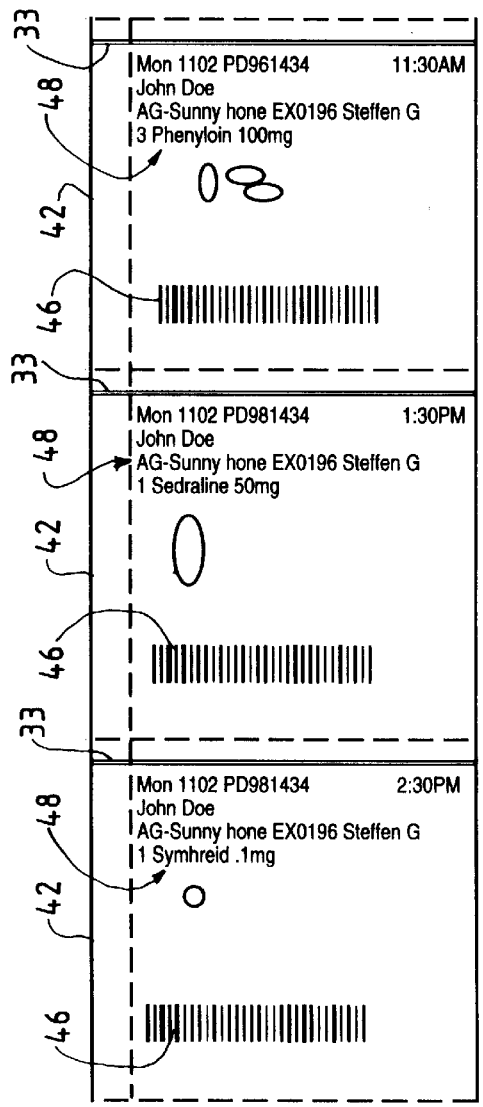

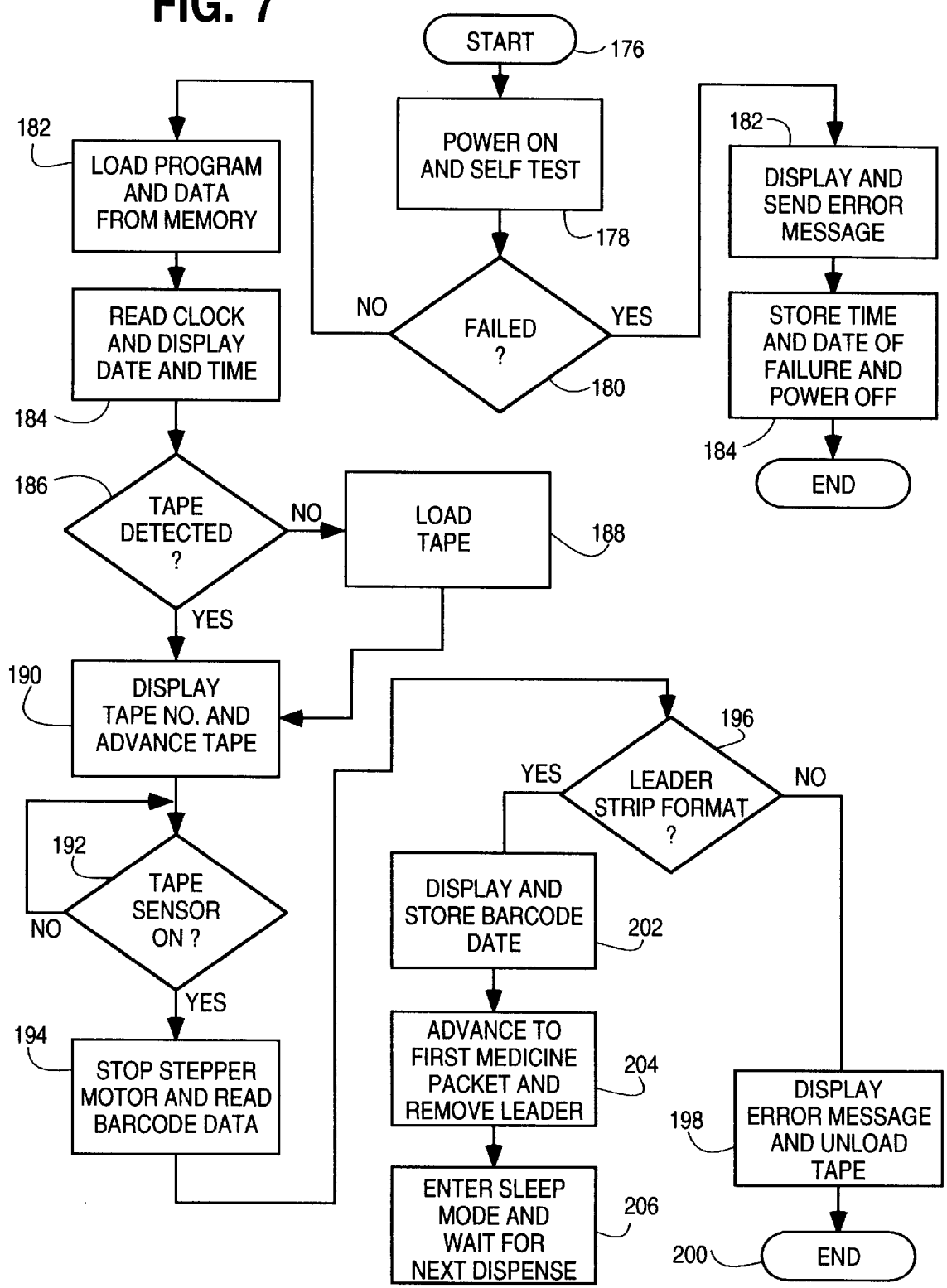

REMOTELY PROGRAMMABLE MEDICATION DISPENSING SYSTEM

FIELD OF THE INVENTION

The present invention generally relates to medication dispensing systems and, more particularly, to a system for monitoring a number of remotely programmable drug dispensers in a given geographic area each of which is used to assist a patient in the accurate execution of a prescribed medication regimen.

BACKGROUND OF THE INVENTION

Advances in medical technology over the years have played a factor in people living longer and healthier lives. Irrespective of these advances, a number of health problems such as hypertension, arthritis, myasthenia gravis, heart conditions and the like persist. Treatment of these health problems often requires that a patient comply with a relatively complex medication regimen by which the patient must take certain dosages of certain medications at various times throughout the day.

Seniors and the chronically ill are particularly vulnerable to the misuse of prescription drugs, especially where a number of different drugs are to be taken throughout the day and night or where one drug is to be taken at precise time intervals. For example, in an attempt to comply with a prescribed medication regimen in which various drugs are to be taken at different points of time throughout the day, a patient may apportion out the daily prescription and quantities of medication, and then take all of this medication in one dose at a particular time. Similarly, patients have been known to increase the dosage of drugs that are taken without obtaining approval of their physician based upon the mistaken belief that if one dose is good, then two must be better.

Non-compliance with medication regimens in this fashion can cause serious health problems and lead to permanent institutionalization which could be avoided if the prescribed regimen were followed more precisely. For example, prescription drug mishaps, in which noncompliance is a major factor, result in significantly increased medical costs and between three to five percent of all hospital admissions are directly related to an adverse drug reaction caused by mismedication.

Various medication dispensing systems and controls have been used to combat the patient non-compliance problem. For example, U.S. Pat. No. 5,412,372 to Parkhurst et al. describes a portable drug dispenser which uses a blister pack of pills having a two-dimensional array of drugs. In use, the blister pack is interconnected with a monitoring unit. The drugs are dispensed from the two-dimensional array by a user physically breaking the blister package and then removing the pill. The control unit detects the breakage of the blister package and internally records the time of breakage as an indication of the time the pills were consumed. In addition, the control unit provides audible and visual alarms to alert a user of the need to take the medication.

U.S. Pat. Nos. 5,267,174 and 5,329,459 to Kaufman et al. disclose medication dispensing systems that are interactive with the needs of the patient. These systems may dispense medications of a first or second variety. In both systems, timers restrict access to either medication based upon the risks associated with each medication. Physiological monitoring facilities are provided along with communication facilities to allow health care professionals at remote locations to assess risks and authorize the dispensation of medications.

U.S. Pat. No. 5,072,430 discloses a device for indicating a need to take a prescribed doses of medication that are stored in a blister package. The device monitors and then electronically stores the identity of the blister package that is broken. The device is particularly suited for use in trials of new drugs and medicaments.

U.S. Pat. No. 5,047,948 to Turner discloses a pill dispenser that includes features for special medication and for emergency help. Pills are dispensed from rotating spiral actuators and timers provide a minimum time interval between which medication may be taken.

U.S. Pat. No. 5,020,037 to Raven discloses an alarm pill box which contains a single pill compartment. A display alerts a user at a preprogrammed time to take the medication. Raven contains no provisions for dispensing pills or for remotely ordering refills and, significantly, no control mechanism is used to prevent overmedication by a patient.

U.S. Pat. No. 5.,014,875 to McLaughlin et al. discloses a security and dispensing device for drugs and medical supplies. Access to various compartments is allowed only through the entry of appropriate identification codes. Patient drug prescriptions may be entered remotely by a pharmacy for display on a monitor associated with the security and dispensing device. A nurse or other facility employee retrieves drugs for delivery to patients based upon entry of a personal identification code and/or patient information.

U.S. Pat. No. 4,911,327 to Shepherd et al. discloses a pill dispenser that individually dispenses pills at predetermined times. An audio and visual alert is activated at the predesignated times. The dispenser has features to alert a nurse if the pill is not taken and to call a pharmacy when the unit is empty. The unit can be remotely programmed and uses a reloadable carousel to dispense pills.

U.S. Pat. No. 4.847,764 to Halvorson describes a computer-based remotely located drug dispensing station for use in a hospital. The drugs are packaged in individual units are and delivered to a nurse by the dispensing station for distribution. A computer associated with the dispensing station notifies the nurse of a need for medication which the nurse then delivers to the patient. When the station is empty, the computer automatically orders more medication from an interconnected pharmacy.

U.S. Pat. No. 4,748,600 to Urquhart discloses a pill dispenser that is interactive with the needs of a patient. Pills are dispensed from a carousel based upon the patient's requests and the risks associated with the particular drug used. When a pill is not taken, a communications link requests help.

U.S. Pat. No. 4.733,362 to Haraguchi discloses a drug dispensing apparatus which utilizes a packaging sheet or paper for accommodating individual drug doses in separate packets. The patient's name, times for taking the drug doses, and other pertinent information is printed on the packets.

U.S. Pat. No. 4,695,954 to Rose et al. discloses a programmable drug dispenser having a prescribed dose of medication contained within a number of individual compartments. A programmable controller of the dispenser unlocks an access door to each compartment at an appropriate instant and sounds an alert for a patient to ingest the medication. The system includes a monitor through which medical personnel can obtain a video display or printed record of the prescription information and patient compliance information which is stored within a memory device. A modem is included for transmitting the data stored within the memory device to a central location.

U.S. Pat. No. 4,616,316 to Hanpeter et al. discloses a medication compliance monitoring system comprising a blister pack having an array of medications which is detachably connected to an electronic memory circuit. The memory circuit detects and stores the time when the blister pack is ruptured over an extended period of time and can be hard-wire connected to a microcomputer to process the data and provide a display of compliance information.

The Baxter® ATC 212 Automated Medication Dispensing System is an apparatus by which patient medication orders can be dispensed in flexible strips of labelled packages. Each strip comprises a number of individual packages of medication that are separated by perforations. Relevant information such as patient name, medication name, time and date of medication administration and the like is printed on the face of each package in text as well as barcode. This system is particularly suited for large-scale applications and other institutional uses, but is not amenable for use in the home health care environment.

SUMMARY OF THE INVENTION

It is desirable to provide a remotely programmable medication dispensing system including a relatively small, microprocessor-controlled machine that assists in the accurate execution of a physician-prescribed medication regimen. For this purpose the correct dose of each medication to be dispensed at a particular time is packaged in individual storage packets defined in a flexible tape. The machine dispenses each packet of medication in the correct dose at the prescribed time to a patient by analyzing the information regarding the medications to dispensed and other pertinent information that is printed in barcode on each packet. The machine can be used as a stand-alone unit, or can be integrated into a centrally-controlled pharmaceutical network.

This system has a number of advantages. First, the system allows better management of a patient's medications and implementation of a physician's treatment plan. Second, use of the system requires a minimum of patient responsibility thereby enhancing patient compliance with a prescribed medication regimen. Third, the system is inexpensive to manufacture and utilize due to its small size and the availability of a number of suitable off-the-shelf component parts. Fourth, integration of the machine into a centrally-controlled pharmaceutical network allows each machine to be remotely accessed for security audit, operation and dispense history, and remote dispensing purposes.

Other features and advantages of the invention will become apparent from the description that follows.

DESCRIPTION OF THE DRAWINGS

FIG. 2A illustrates a perspective view of a flexible tape having a number of individual packets each of which contains a prescribed dose of medication;

FIG. 2B is a front, elevational view of three packages of medications that form part of the tape illustrated in FIG. 2A;

FIG. 7 is a flow chart illustrating the program steps necessary for the roll of flexible tape shown in FIG. 2A to be loaded into the medication dispenser shown in FIG. 1A and be made ready for use.

DETAILED DESCRIPTION OF THE INVENTION

Figure 1A:
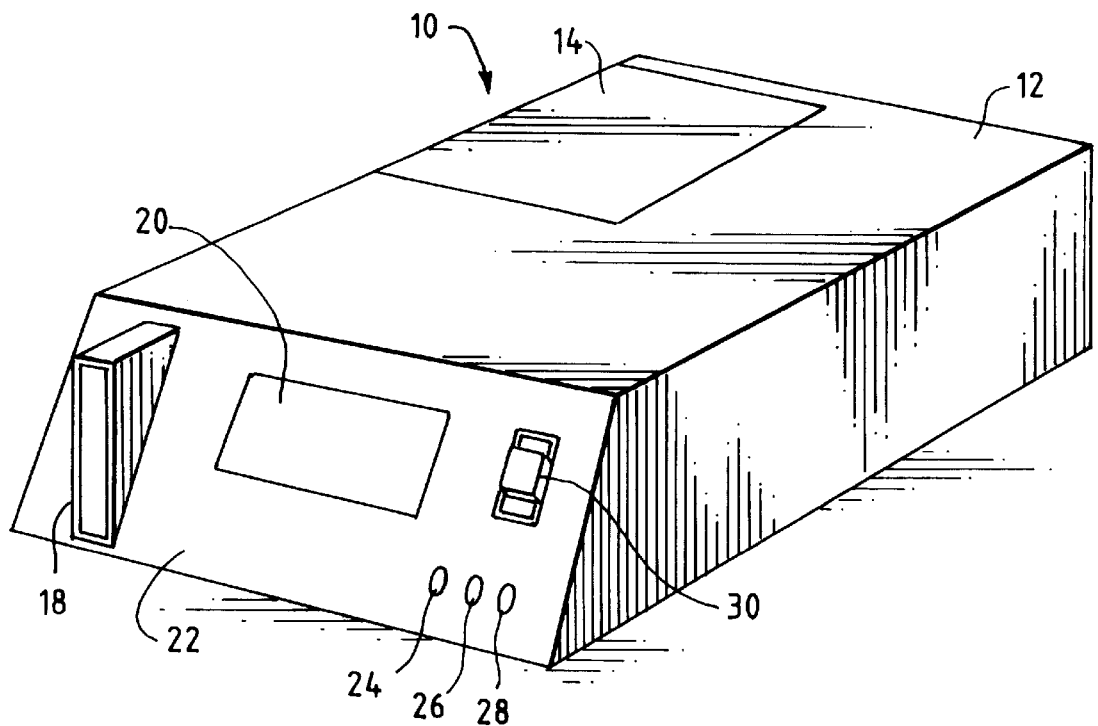
FIG. 1A is a front, perspective view of a remotely programmable medication dispensing device in accordance with an embodiment of the present invention.
Figure 1B:
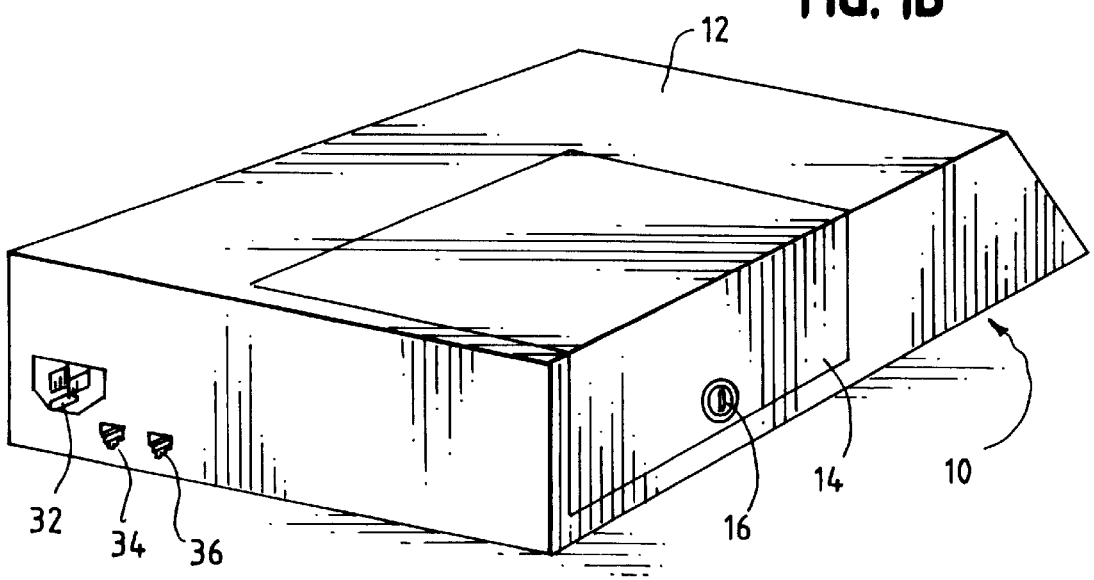
FIG. 1B is rear, perspective view of the remotely programmable medication dispensing device shown in FIG. 1A.
Figure 4:
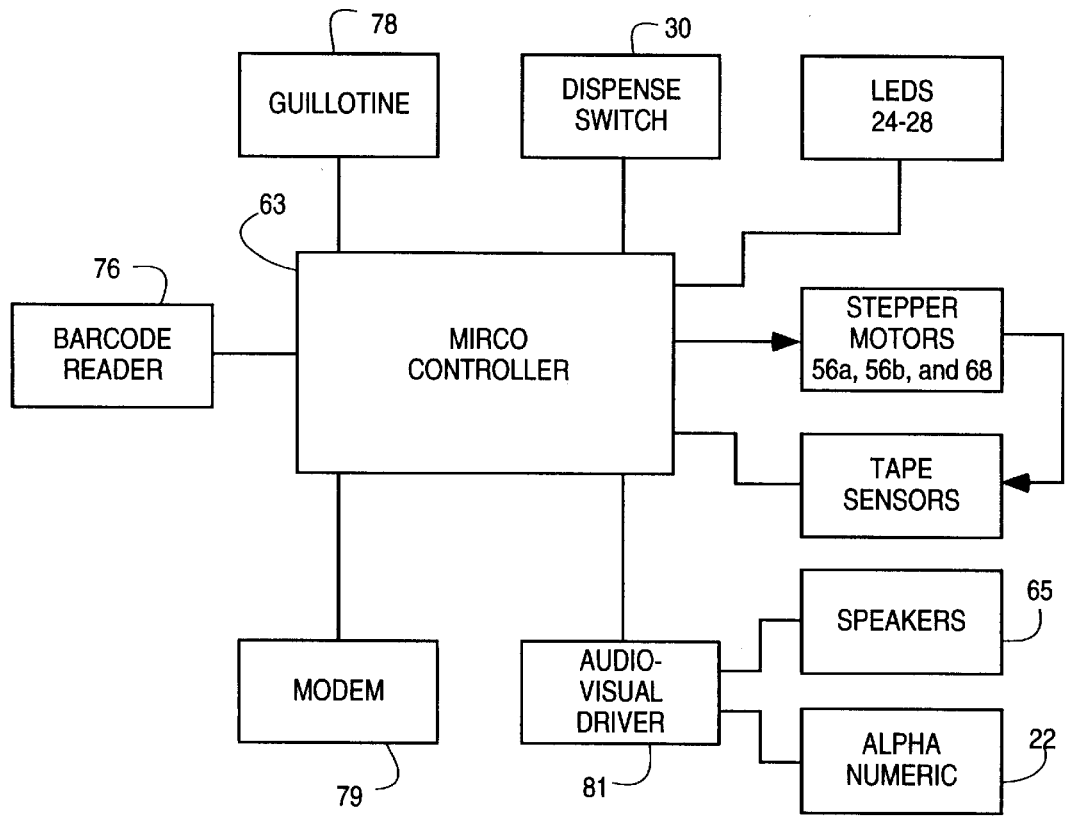
FIG. 4 is a schematic diagram which shows the electrical components of the device shown in FIG. 1A that are used to dispense packets of medication at prescribed times.

Referring to FIGS. 1A and 1B, front and rear perspective views of a remotely programmable medication dispensing device 10 in accordance with an embodiment of the present invention are illustrated. Device 10 includes a housing 12 and a door 14 that may be removed to allow access to the interior of housing 12. A lock 16 is provided to secure door 14 to housing 12 and may be opened only by authorized personnel. Device 10 includes an aperture 18 through which a flexible tape containing a number of packets of medications that are to be dispensed to a patient at prescribed times is moved. A liquid crystal display 20 is provided on the front face 22 of device 10 together with light emitting diodes 24, 26, and 28 and dispense switch 30, each of which is electrically connected to a microcontroller 63 (FIG. 4). An audio speaker 65 (FIG. 4) is mounted within housing 12 and a power outlet 32 allows the device 10 to be connected to an external AC power source (not shown). Device 10 can be connected to a standard telephone line via jack 34 and a telephone may be connected to device 10 via jack 36.

FIG. 2A shows a perspective view of a flexible tape 38 which contains a number of prescribed medications that are stored in individual packets. Tape 38 is manufactured from two thin polymer strips that are approximately from about 2.5 to 3.5 inches wide that are thermally fused together at the top, bottom, leading edge, and at a set distance along its length to form a number of individual medication storage packets. In particular, tape 38 includes a leader strip 40 and a plurality of individual packets 42 (three of which are shown) that are contained in a roll 44. Each packet 42 contains one dose of a prescribed medication as shown and is separated by a perforation to allow each packet to be individually dispensed through aperture 18. A main perforation is provided along one edge of the tape so that a patient may open a dispensed packet and then take the prescribed dose of medication contained therein. Barcode information 46 and text information 48 are thermally imprinted on tape 38 as shown in FIG. 2B.

The barcode and text information 46 and 48 on leader strip 40 describe the intended use and contents of the tape 38. This subject matter includes patient identification information, the name and telephone number of the patient's care guardian such as a pharmacy or physician, the type of communication to be sent to a central management authority, and the length of each individual packet 42. The barcode and text information 46 and 48 on each package 42 includes the exact quantity, dose and type of medication that is to be dispensed, the date the medication is to be dispensed, and the time when the medication is to be dispensed. At a minimum, the barcode data must contain the date and time of dispensation to the patient so that each package 42 of medication can be dispensed through opening 18 at the prescribed date and time as discussed hereafter.

Figure 3A:
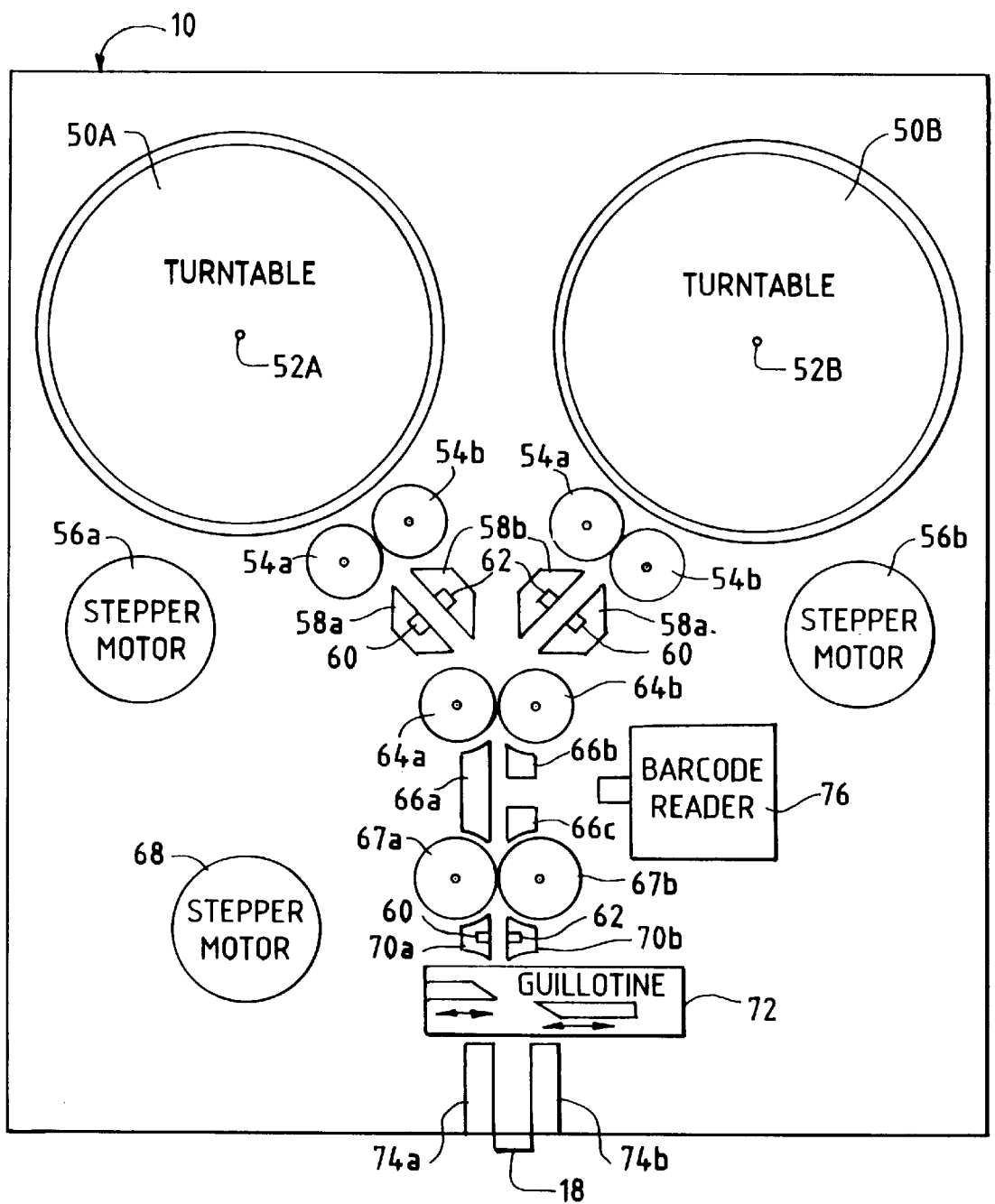
FIG. 3A is a schematic diagram which shows the mechanical components of the device shown in FIG. 1A that are used to dispense packets of medication at prescribed times.

FIGS. 3A and 4 are schematic diagrams of the showing how the component parts of the remotely programmable dispensing device 10 shown in FIG. 1A are used to dispense the medications contained in a flexible tape (FIG. 2A) through the aperture 18 in housing 12. All of the components shown in FIG. 3A are mounted on a board 49 in housing 12. Device 10 includes two turntables 50a and 50b) which are freely rotatable about an axis 52a and 52b, respectively. A rolled, flexible tape of medications (FIG. 2A) may be mounted on each turntable for dispensation to a patient. Each tape is inserted between a pair of primary drive rollers 54a and 54b which are driven by stepper motors 56a and 56b, rotatable about a central axis as shown, and supply the tape to two guide members 58a and 58b. An optical switch comprising a light source 60 and a detector 62 are provided on both sets of guide members 58a and 58b to sense the presence of a tape therebetween and allow microcontroller 63 to control the operation of stepper motors 56a and 56b. Other suitable types of switches for this purpose are readily apparent to one of ordinary skill in the art.

A first pair of main drive rollers 64a and 64b feed the tape from either turntable 52a or 52b through guide members 66a, 66b and 66c to a second pair of main drive rollers 67a and 67b . Both pairs of main drive rollers are rotatable about a central axis as shown and are driven by a stepper motor 68. Guide members 70a and 70b include an optical switch comprising a light source 60 and a detector 62 for sensing the presence of a tape therebetween and allowing the microcontroller 63 to control the operation of the stepper motor 68. A guillotine 72 and guide members 74a and 74b, which guide the tape through aperture 18, are mounted on the board 49 as shown.

A barcode reader 76 is mounted inside housing 12 and oriented with respect to guide members 66b and 66c so that it can read the barcode information present on the tape. Device 10 is constructed so that the horizontal distance between the optical switch on guide members 70a and 70b and the midpoint of the guide members 66b and 66c is equal to the distance between each section of barcode information 46 that is printed on tape 38. Alternatively, the optical switches could be spaced from the guide members a distance equal to the distance between the bar code and an indicator strip 33 (FIG. 2B). Barcode reader 76, guillotine 78, and a modem 79 are mounted on board 49 and electrically connected to the microcontroller 63 as shown in FIG. 4. Audio-visual driver 81 is connected to speaker 65 and display 22 to provide audio and visual alarms which provide an indication to a patient that the time to take a prescribed dose of medication has arrived as discussed in greater detail hereafter.

Figure 3B:
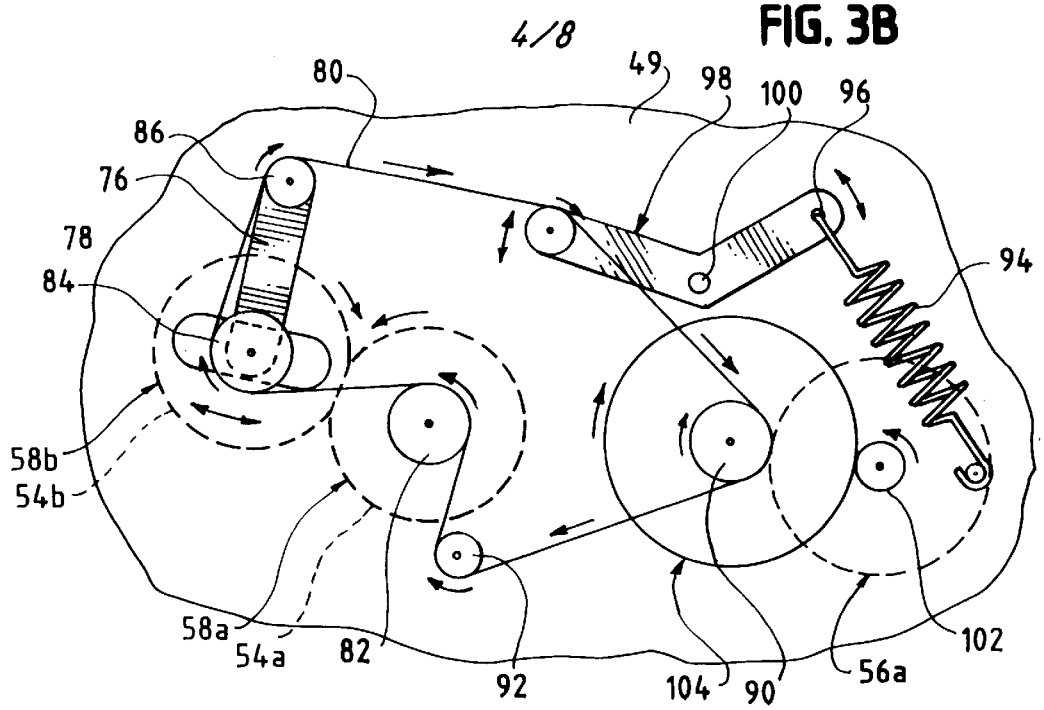
FIG. 3B is a bottom view of one of the primary tape drives shown in FIG. 3A which shows how a stepper motor rotates a pair of drive rollers to move the flexible tape of medications shown in FIG. 2A.

Referring to FIG. 3B, a bottom view of one of the primary tape drives shown in FIG. 3A is illustrated. A tape from turntable 52a is threaded through the respective drive rollers 54a and 54b until the sensor on the guide members 58a and 58b detects the tape. Roller 58a is mounted in a fixed position on board 49 and roller 58b is rotatably connected to a pivot arm 76 which is mounted on and moves within a slot 78 provided in the mounting board 49. Roller 58b is held against roller 58a using an adjustable spring tension translated through a timing belt 80 and pulleys 82–92 as discussed hereafter.

Stepper motor 56a drives the rollers 58a and 58b in the direction shown via pinion gear 102, reduction gear 104, pulleys 82–92 and timing belt 80 as shown. One end of spring 94 is fixed to the mounting board 49 and the other end of spring 94 is attached to an end 96 of member 98. Member 98 is rotatable about axis 100. The rollers 58a and 58b (together with the other rollers illustrated in FIG. 3A) are made from a soft, compressible polyurethane foam or other suitable material that is capable of gripping and driving a tape without breaking or damaging the medications contained in the tape. Thus, when a tape containing relatively thick medications is passed between rollers 58a and 58b, roller 58b is moved away from roller 58a against the tension of spring 94. Conversely, when a tape packet containing relatively thin medications is passed between rollers 58a and 58b, roller 58b move towards roller 58a with the tension of spring 94. In both cases, the tape is gripped with sufficient force by the rollers 58a and 58b to allow it to be moved and eventually dispensed through the aperture 18 in housing 12 to a patient.

Figure 3C:
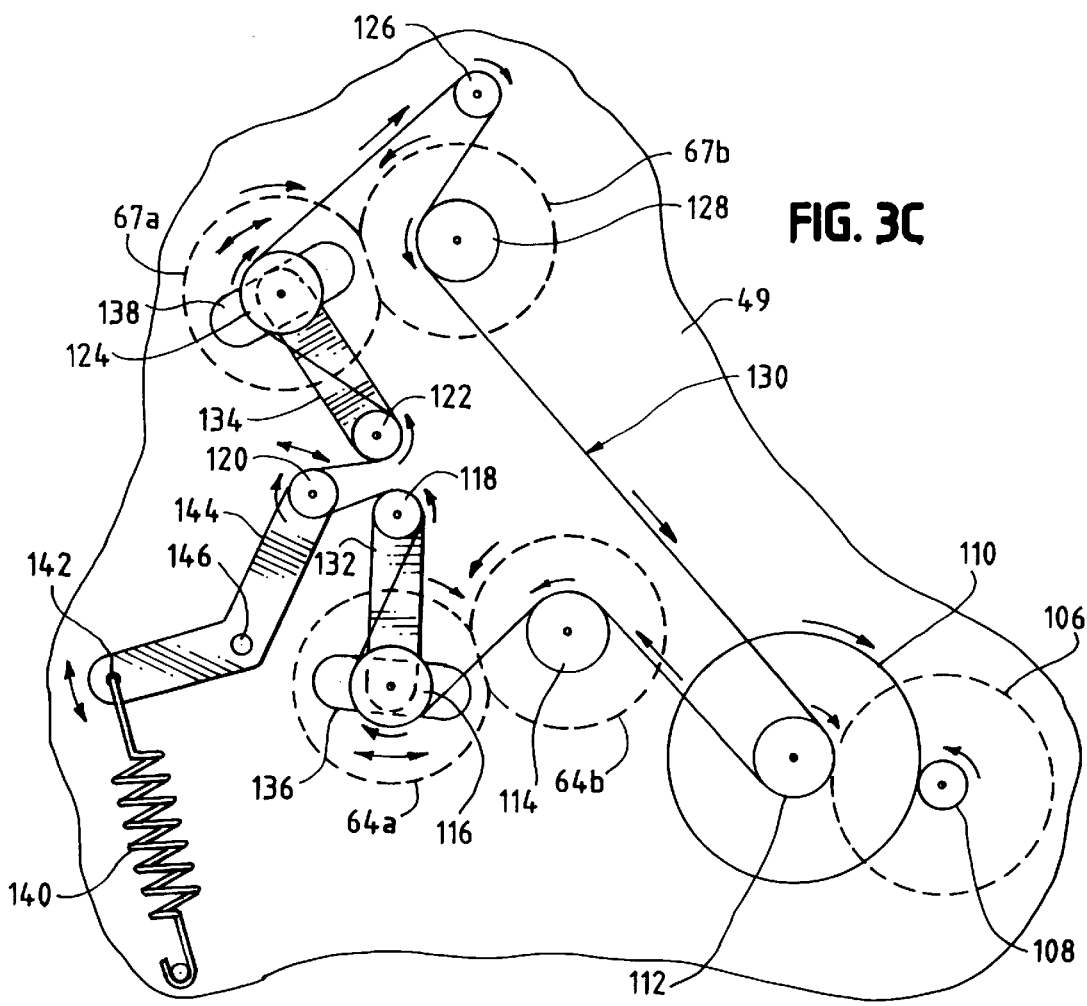
FIG. 3C is a bottom view of the main tape drive shown in FIG. 3A which shows how a stepper motor rotates both pairs of main drive rollers to move the flexible tape of medications shown in FIG. 2A.

FIG. 3C is a bottom view of the main tape drive shown in FIG. 3A which shows the interconnection of a stepper motor 106 with both pairs of main foam drive rollers 64a/64b and 67a/67b that are used to grip and drive a tape from either turntable 50a or 50b. Stepper motor 106 drives the foam roller pairs 64a/64b and 67a/67b via pinion gear 108, reduction gear 110, pulleys 112–128 and double sided timing belt 130. Rollers 64b and 67b are mounted in fixed positions on board 49 and rollers 64a and 67a are rotatably connected to pivot arms 132 and 134 which are mounted on and move within slots 136 and 138 provided in board 49. One end of spring 140 is fixed to board 49 and the other end of spring 140 is attached to an end 142 of member 144. Member 144 is rotatable about axis 146. Thus, rollers 64a and 67a are held against rollers 64b and 67b using an adjustable spring tension translated through timing belt 130 and pulleys 112–128 as discussed with reference to FIG. 3B.

Some of the component parts of dispenser 10 are discussed hereafter. A Z-world Engineering Z104 general purposes C-programmable PC/104 controller which includes a random access memory and an electronically programmable read-only memory is utilized for microcontroller 63. Guillotine 72 comprises an Ohyane Riki ORC-MTG3I guillotine cutter and an Omron EE-SB5V-E infrared source/detector pair may be utilized for the sensors disposed on the guide members shown in FIG. 3 which are used to detect the presence of the flexible tape shown in FIG. 2A.

Figure 5:
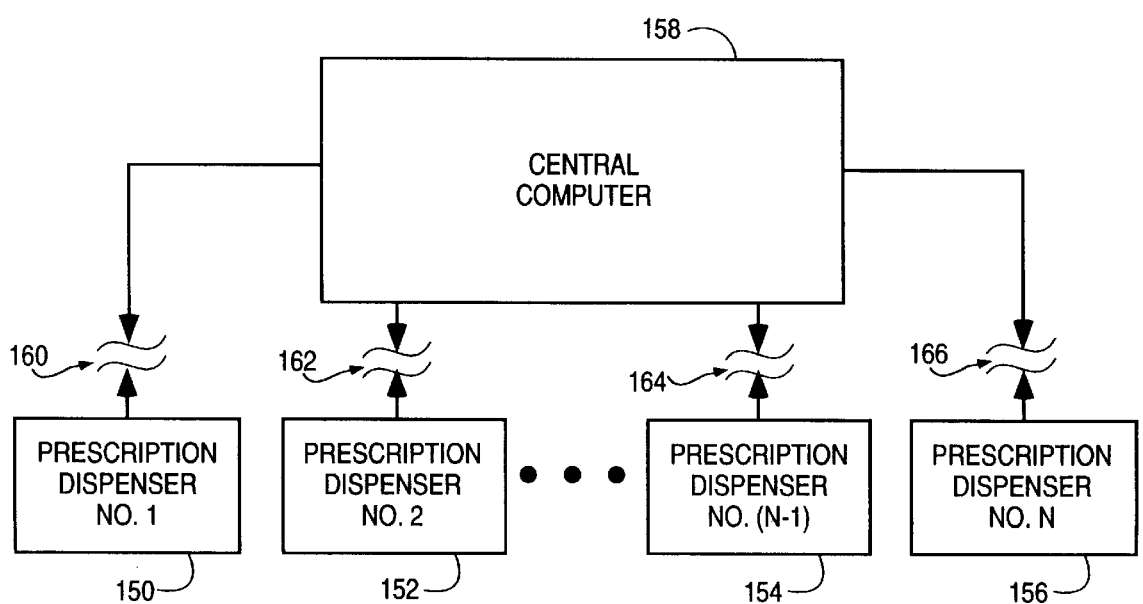
FIG. 5 is a schematic diagram showing a number of medication dispensers connected to a central computer.

The dispenser 10 can be utilized as a stand-alone unit or as a part of a network of units as shown in FIG. 5 wherein prescription dispensers 150–156 are connected to a central computer 158 via telephone lines 160–166. In a fully remote-controlled mode, the complete operation of the device 10 can be transferred to the remote site by deactivating any local control irrespective of any barcoded data printed on the flexible tape. This type of operation may be desirable where the prescription dose and times for an individual patient are dynamically changing, or where common, generic doses of one medication or a mix of medication are packaged in a flexible tape as shown in FIGS. 2A and 2B. Another variation on this theme where security is not an issue is that the device would enable a patient to dispense a medication packet at any time by pressing the dispense button, but the device 10 would record and transmit the change in inventory to an automated inventory management system contained in the central computer 158.

The device 10 may be programmed to send date via the modem concerning the dispense status and/or history at prescribed times to the central computer 158 so that a patient's compliance with a prescribed medication treatment or regimen can be determined. In this application, periodic downloads are made to a central database, a message is sent to the patient's care provider that a machine failure or power-outage has occurred, messages concerning the patient's failure to take the prescribed medicine after an allotted time are sent, or each medication dispenser is remotely analyzed to determine whether the machine is on-line and not compromised. Security audits of the medication stored in each device are desirable for compliance monitoring purposes, especially where dangerous or expensive drugs are to be dispensed.

Figures 6A, 6B:
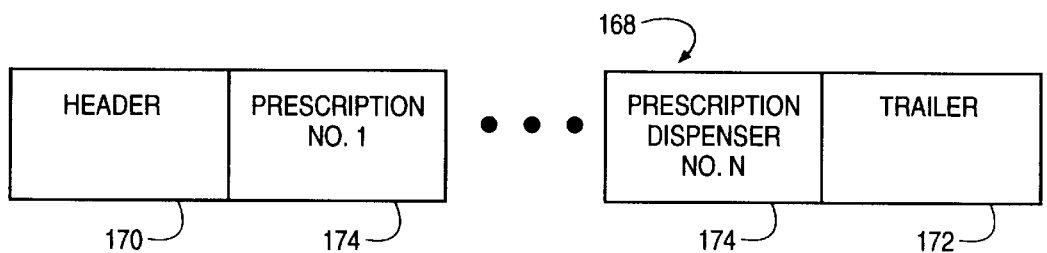
FIG. 6A is a schematic diagram of a data packet comprising a number of different prescriptions for medication that can be sent from each medication dispenser to a central location as shown in FIG. 5 so that patient compliance with a prescribed medication regimen can be determined.
FIG. 6B is a schematic diagram of one of the prescriptions shown in FIG. 6A.

FIG. 6A is a schematic diagram of a data packet comprising a number of different prescriptions for medication that can be sent from each medication dispenser to a central location via modem 79 and a telephone line or other suitable communication link so that patient compliance with a prescribed medication regimen can be determined. The data packet 168 contains a header 170, a trailer 172, and a number of prescribed doses 174 of medications that a patient must take at particular times during a reporting session or period, typically one day. FIG. 6B illustrates a schematic diagram of one of the prescriptions 174 shown in FIG. 6A. Each prescription contains patient identification information, the prescribed and actual dispense times, and medication information as shown which is stored in a database contained in the central computer 158 so that patient compliance with the prescribed medication schedule can occur. For this purpose, well known statistical analysis techniques and the like are utilized as readily apparent to one of ordinary skill in the art based upon a review of the disclosure contained herein.

FIG. 7 is a flow chart illustrating the program steps necessary for the roll of flexible tape shown in FIG. 2A to be loaded into the medication dispenser shown in FIG. 1A and be made ready for use. If the machine 10 fails a self-test after being turned on and connected to a telephone line, an error message is displayed and sent to the central monitoring authority and the date and time of the failure is stored in the memory provided in microcontroller 63, steps 176–184. If the machine does not fail the self-test, then the system program and other pertinent data stored in the microcontroller 63 is loaded, the time and date is read from an internal clock, and this information is displayed on liquid crystal display 20, steps 182–184. After a tape from either turntable 52A or 52B is detected and loaded, steps 186–188, the tape is advanced until the sensor on guide members 70a and 70b is closed. Closure of the optical switch signals the microcontroller 63 to deenergize the stepper motors that are utilized to drive the tape and activate the barcode reader 76, steps 190–194.

If a leader strip is not detected by the barcode reader 76, then an error message is displayed and the tape is unloaded, steps 196–200. If a leader strip is present, the barcode data is stored in a memory associated with microcontroller 63, the tape is moved so that the guillotine 72 severs the leader strip from the first medication packet, and the device waits for the time that the medication contained in the first medication packet is to be dispensed, steps 202–206.

Figure 8:
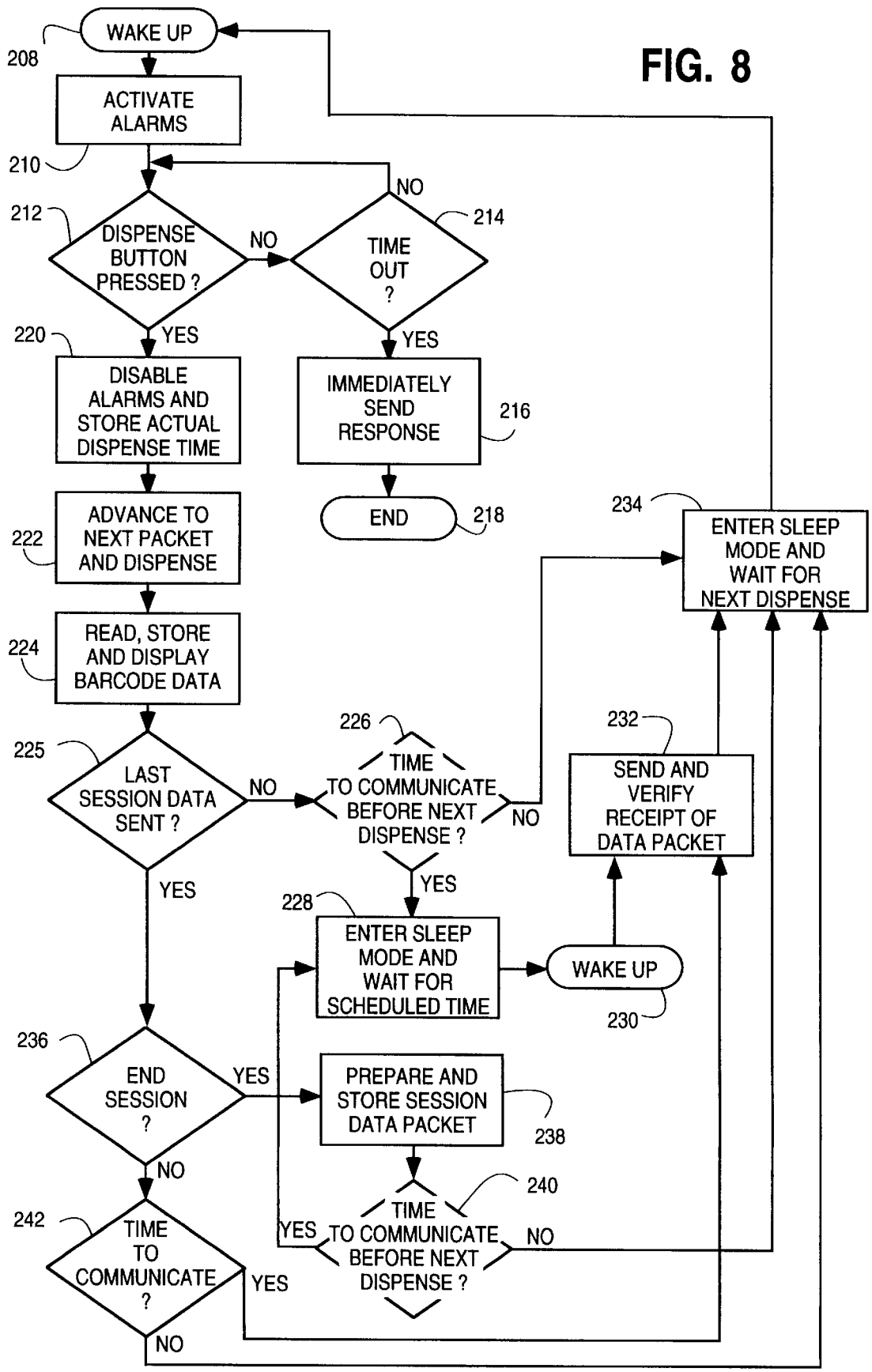
FIG. 8 is a flow chart illustrating the program steps necessary for the dispensation of the medications contained in a flexible tape as shown in FIG. 2A according to the prescribed regimen that is noted in text and barcode on each individual packet.

Referring to FIG. 8, a flow chart illustrating the program steps necessary for allowing the medications contained in a flexible tape as shown in FIG. 2A according to the prescribed regimen that are noted in text and barcode on each individual packet to be dispensed is illustrated. In general, a data packet comprising a number of different prescriptions for medication that a patient is prescribed to take during a predetermined time interval or session (see FIGS. 6A and 6b) can be sent from the medication dispenser to central computer 158 (FIG. 5).

When the time for the first medication to be dispensed arrives, the machine wakes up and audio and visual alarms are provided via speaker 65 and LEDs 24–28, steps 208–210. If the dispense switch 30 is not pressed within a predetermined amount of time, typically thirty minutes, then a message is immediately sent to the patient's care provider, steps 212–218. When the patient activates switch 30 within the prescribed time, then the alarms are disabled, the time that the medication was dispensed is stored, the tape is advanced so that the barcode on the next medication storage packet can be read by barcode reader 76, displayed on display 22, and stored by the microcontroller 63, steps 220–224.

If the last session data has not been sent and the time to send the data from one session is prior to the time for the next dispense, then the device 10 waits for that time, sends the data to computer 158, verifies the receipt thereof, and then waits for the next time to dispense, steps 225–234. Otherwise, the device 10 enters sleep mode and waits for the next dispense time, step 234.

When the last session data has not been sent and the current time is prior to the end of the current session, then a data packet as shown in FIGS. 6A and 6B is prepared, steps 225, 236 and 238. If the scheduled time to communicate the data packet to the central computer 158 is prior to the next dispense time, step 240, then steps 228–234 are executed. Otherwise, the device 10 enters sleep mode and waits for the next time to dispense, step 234. When the last session data has been sent, the current time is prior to the end of the current session, and the current time is prior to the scheduled time to communicate, steps 225, 236 and 242, then the device 10 again enters sleep mode and waits for the next time to dispense, step 234. Otherwise, the device sends the data packet, verifies its receipt and waits for the next time to dispense, steps 242 and 234.

While the invention has been illustrated and described in detail in the drawings and foregoing description, the same is considered as illustrative and not restrictive in character, it being understood that all changes and modification that come within the spirit of the invention are desired to be protected.

We claim:

1. A medication dispensing device, comprising:
   a housing having a dispensing aperture;
   at least one flexible tape provided in said housing at a storage location, said tape having a plurality of individual medication storage packets arranged in successive order, wherein each of said packets contains at least one prescribed dose of a medication that is to be ingested at one time and wherein each packet contains visible barcode information concerning the time and date of when the medication contained in the packet immediately following and adjacent thereto is to be dispensed, said tape further comprising a leader strip having visual barcode information displayed thereon concerning the length of each of said storage packets and the time and date that the first storage packet is to be dispensed through said aperture;

a mechanism mounted in said housing for moving said flexible tape from said storage location and for dispensing individual ones of said packets out of said dispensing aperture; and a circuit mounted in said housing for reading and analyzing the barcode data displayed on the storage packets of said flexible tape and for controlling said moving and dispensing means to allow each of said storage packets to be dispensed at the date and time recorded on the barcode information stored on the storage packet immediately preceding and adjacent thereto.

2. The medication dispensing device of claim 1 wherein said mechanism comprises at least one pair of compressible rollers that grip said tape and move said tape from said storage location and through said aperture.

3. The medication dispensing device of claim 2 wherein said mechanism further comprises means for adjustably positioning said rollers relative to each other to allow said tape to be moved without damaging the medications contained in said storage packets.

4. The medication dispensing device of claim 1 wherein said housing further comprises a door for allowing access to the interior of said housing and a lock for securely locking said access door to said housing.

5. A medication dispensing system, comprising:

a central computer located at a first location; and at least one medication dispensing device at a second location which is remote from said first location, said device communicating with said central computer to allow patient compliance with a prescribed medication regiment to be determined, said at least one medication dispensing device comprising:

a housing having a dispensing aperture, at least one flexible tape provided in said housing at a storage location, said tape having a plurality of individual medication storage packets arranged in successive order, wherein each of said packets contains at least one prescribed dose of a medication that is to be ingested at one time and wherein each packet contains visible barcode information concerning the time and date of when the medication contained in the packet immediately following and adjacent thereto is to be dispensed, said at least one flexible tape further comprising a leader strip having visual barcode information displayed thereon concerning the length of each of said storage packets and the time and date that the first storage packet is to be dispensed through the aperture of the corresponding one of said devices;

a mechanism mounted in said housing for moving said flexible tape from said storage location and for dispensing individual ones of said packets out of said dispensing aperture, and a circuit mounted in said housing for reading and analyzing the barcode data displayed on the storage packets of said flexible tape and for controlling said moving and dispensing means to allow each of said storage packets to be dispensed at the date and time recorded on the barcode information stored on the storage packet immediately preceding and adjacent thereto.

6. The medication dispensing system of claim 5 wherein the mechanism of each of said devices comprises at least one pair of compressible rollers that grip said tape and move said tape from said storage location and through the aperture of the corresponding one of said devices.

7. The medication dispensing device of claim 6 wherein the mechanism of each of said devices further comprises means for adjustably positioning said rollers relative to each other to allow said tape to be moved without damaging the medications contained in said storage packets.

8. The medication dispensing system of claim 5 wherein the housing of each of said devices comprises a door for allowing access to the interior of said housing and a lock for securely locking said access door to said housing.

* * * * *